United States Patent Office 3,437,677
Patented Apr. 8, 1969

3,437,677
N,N'-DIOLEYLDITHIOOXAMIDE AND POLYVALENT METAL COMPLEXES THEREOF
Hugh C. Bertsch, St. Louis, Mo., Richard N. Hurd, Terre Haute, Ind., John P. McDermott, Dearborn, Mich., and Wesley R. White, University City, Mo., assignors to Mallinckrodt Chemical Works, St. Louis, Mo., a corporation of Missouri
No Drawing. Filed May 23, 1967, Ser. No. 640,468
Int. Cl. C07f 3/06; C10m 1/54; B41m 5/00
U.S. Cl. 260—429  5 Claims

ABSTRACT OF THE DISCLOSURE

N,N'-dioleyldithiooxamide (DODTO) is prepared by the Wallach reaction and is purified by chromatography on a column of fuller's earth or activated alumina. The pure compound is a yellow liquid, miscible with hydrocarbon and other organic solvents. It is useful as an antiozonant for white rubber and as a chromogen in copying and duplicating processes. The zinc, nickel and cadmium complexes are soluble in hydrocarbon solvents.

BACKGROUND OF THE INVENTION

The present invention relates to the field of organic chemistry and more particularly to acyclic amides.

Briefly, the invention is directed to N,N'-dioleyldithiooxamide (DODTO), to complexes thereof with certain polyvalent metals, and to methods of preparing these novel compounds in an essentially pure state.

The preparation of various N,N'-dialkyl derivatives of dithiooxamide has been reported by a number of investigators, beginning with the early work of Wallach (Ann., 262, 360 (1891)). Wallach prepared the dialkyl derivatives of dithiooxamide by the condensation of dithiooxamide with primary alkylamines as represented by the following equation:

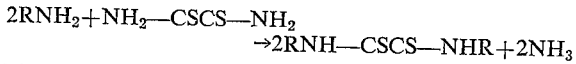

The Wallach reaction using primary saturay saturated aliphatic amines usually proceeds satisfactorily under mild conditions. Ordinarily, a solvent, such as alcohol, is used as an inert retaction medium, although in the case of liquid amines the amine itself may serve as the reaction medium. Isolation and purification of the products of the reaction is normally accomplished readily through the use of conventional techniques such as precipitation and crystallization.

The preparation of a number of higher N,N'-dialkyldithiooxamides has been reported or suggested, including the compound, N,N'-dioctadecyldithiooxamide, derived from the $C_{18}$ saturated amine, octadecylamine. (See Levesque, U.S. Patents 2,525,075 and 2,531,283.)

The preparation of a disubstituted dithiooxamide wherein the two substituents are short chain olefinic radicals has also been reported. This compound is N,N'-diallyldithiooxamide. (See Hurd et al., J. Org. Chem. 26, 3980 (1961).)

In the homologous series of the N,N'-dialkyldithiooxamides, progressive lengthening of the alkyl chain is accompanied by generally unremarkable changes in various physical properties, such as melting point, color and solubility in various solvents. Further, in their reactions with chelatable metal compounds, all N,N'-dialkyldithiooxamides, wherein the N- and N'-substituents are identical give rise to organometallic chelates with similar and predictable properties. For example, all nickel chelates of such dithiooxamides are quite insoluble in all aliphatic and aromatic hydrocarbon solvents at room temperature; also, all zinc complexes are intractable solids that do not liquify, become rubbery, or exhibit other workable properties at any temperatures below their decomposition points. These characteristics have been reported in such literature references as Hurd et al., J. Am. Chem. Soc., 82, 4454 (1960), and Hurd et al., "Further Studies on the Metal Complexes of N,N'-Disubstituted Dithiooxamides," in "Advances in the Chemistry of the Coordination Compounds," Macmillan, New York, 1961 (pages 350–365).

SUMMARY OF THE INVENTION

Among the objects of the invention may be mentioned the provision of new derivatives of dithiooxamides; the provision of N,N'-dioleyldithiooxamide and metal complexes thereof; and the provision of novel methods of preparing compounds of the type mentioned in substantially pure form. Other objects and features of the invention will be in part apparent and in part pointed out hereinafter.

The present invention is thus directed to the compound N,N'-dioleyldithiooxamide, to complexes thereof with polyvalent metals and to methods of preparing substantially pure N,N'-dioleyldithiooxamide.

DESCRIPTION OF THE PREFERRED EMBODIMENTS

In accordance with the present invention, there has been prepared in essentially pure form, the novel compound N,N'-dioleyldithiooxamide, whose structure may be represented as follows:

For convenience, this compound may be referred to hereinafter as DODTO. The invention also includes processes for preparing DODTO in a substantially pure state, and it also includes the novel complexes of DODTO with polyvalent metals.

In contrast with the previously known dithiooxamide derivatives referred to above, the novel long chain olefinic derivative, N,N'-dioleyldithiooxamide has been found to possess a number of unique and unexpected properties. Various novel metal complexes of this compound, especially the zinc, nickel and cadmium complexes, have also been found to possess distinctive and unobvious properties.

DODTO is a liquid that is miscible at room temperature with various hydrocarbon solvents, such as hexane and petroleum lubricating oil. This is in marked contrast to the limited solubility (<0.1%) in a lubricating oil of the closely related compound, N,N'-dioctadecyldithiooxamide. DODTO is also soluble in carbon tetrachloride, chloroform, ether and chlorinated aromatic hydrocarbons, as well as in butanol and higher alcohols. It is essentially insoluble in methanol, ethanol, acetone and water.

DODTO is useful as a nonstaining antiozonant for white rubber. Because of its pale color and solubility in hydrocarbon solvents it can be homogeneously dispersed in white rubber without causing staining. DODTO is also useful as a chromogenic agent in copying processes such as spirit duplicating processes and "carbonless" copying processes.

DODTO also forms metal chelates with unique properties. For example, the zinc complex is a plastic material that is easily obtained in the form of flexible translucent film, and can be drawn out in the form of a fiber. This property is unique as related to previously known metal chelates of dithiooxamides. Moreover, the zinc complex of DODTO is highly soluble in hydrocarbon solvents such as hexane at room temperature. This is also a unique property. Fractions of this polymeric chelate that are relatively insoluble in such solvents may be made much more soluble by treating them with aliquats of N,N'-dioleyldithiooxamide in a hexane-ethanol-water solvent. In this way, for example, a fraction that is nearly insoluble in a petroleum solvent marketed under the trade designation "Skellysolve C" can be transformed into one that will readily form 20% by weight solutions in this solvent at room temperature.

Another unique characteristic of N.N'-dioleyldithiooxamidozinc is the substantial increase in viscosity which it imparts to hydrocarbon solvents when dissolved therein in low concentrations.

The zinc complex of DODTO may be obtained in the form of a film by evaporating a solution of the complex in hexane or other volatile hydrocarbon solvent in a flat tray. The film thus obtained is a pale yellow, opaque to slightly translucent sheet, depending on the thickness, which may be cut into strips if desired. The sheet thus formed is flexible and has a considerable degree of spring to it. When such a film is heated, the zinc complex softens but does not liquify and lose shape at temperatures up to a 150° C. Upon softening, it becomes more translucent and will elongate under stress. When thus drawn, a strip exhibits a slight amount of elasticity. A mass of the soft, warm zinc complex may be formed into a ball which, upon cooling and hardening, exhibits a considerable degree of bounce when dropped or thrown against a hard surface.

N,N'-dioleyldithiooxamidozinic is readily prepared in a conventional manner by stoichiometric reaction of DODTO with a zinc salt, such as zinc chloride, in the presence of a stoichiometric amount of base, such as triethylamine, or a buffer such as sodium acetate.

N,N'-dioleyldithiooxamidozinc is an organometallic chelated polymer containing nearly equal numbers of ligand residues and zinc atoms held together by coordinate zinc-sulfur and zinc-nitrogen bonds. Its structure is generally represented by the following formula:

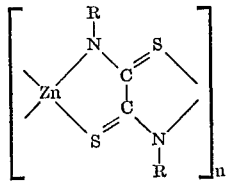

where R represents the oleyl radical.

When the zinc complex is contacted with a nickel salt, a dark violet or blue nickel chelate or complex is formed, which is also soluble in hexane and other hydrocarbon solvents. Such a high solubility for the nickel chelate of a symmetrically substituted N,N'-disubstituted dithiooxamide is a unique and unobvious property. Hydrocarbon-soluble N,N'-dioleyldithiooxamidonickel may also be formed in the conventional manner by reaction of stoichiometric amounts of DODTO and a nickel salt, preferably in the presence of a base.

These reactions, giving rise to N,N'-dioleyldithiooxamidonickel, find useful application in pressure-sensitive copy papers and in the dyeing of nickel-containing polypropylene fibers where violet fibers are obtained that are color-fast to the common dry cleaning solvent, trichloroethylene.

DODTO forms other metal chelates in the manner of all dithiooxamides. These complexes are formed in the conventional manner. N,N'-dioleyldithiooxamidocadmium is a waxy orange solid that possesses solubility characteristics like its zinc counterpart, and hence is unique among cadmium complexes of N,N'-disubstituted aliphatic dithiooxamides. The corresponding mercuric chelate differs in its insolubility in hydrocarbon solvents and also its thermal instability. The cadmium chelate is stable at 100° C., whereas the mercury (II) chelate decomposes to mercuric sulfide at this temperature. N,N'-dioleyldithiooxamidocopper exhibits a number of characteristics that are very desirable in graphic arts reproduction systems, thermal and oxidative stability, good color stability to intense and prolonged exposure to sunlight, and an intense, nearly black appearance in small concentrations.

The following examples illustrate the invention:

Example 1.—N,N'-dioleyldithiooxamide

Crude N,N'-dioleyldithiooxamide was prepared by the controlled addition of 825 g. (3.11 moles) of commercial oleylamine to 186 g. (1.55 moles) of dithiooxamide. During the addition the reaction mixture was stirred. Foaming occurred during admixture of the reactants, but could be controlled through variation in the rate of addition of the amine. During addition, some heat was evolved, but the reaction mass was only warmed to 36° C. from this effect. After addition of amine was complete, the reaction mixture was stirred at room temperature for 18 hours, and then briefly warmed to insure completion of reaction. After filtration from a small solid residue, the crude DODTO was obtained as a black liquid in a yield of 942 g. *Analysis*.—Calcd. for $C_{38}H_{72}N_2S_2$; N, 4.51; S, 10.32. Found: N, 5.02; S, 9.50.

These results are typical of those achieved with commercial oleyamines, such as Formonyte-D608 (manufactured by the Foremost Food & Chemical Co.) Armeen-OD (Armour & Co.) and Alamine-11D (General Mills Co.). If the amine contained a substantial portion of amine carbonate, better yields, faster reaction rates and less foaming were experienced if the amine was first warmed on the steam bath for an hour to decompose the amine carbonate.

The crude DODTO was purified as described below:

Three purification columns were constructed of glass pipe: Each column was four feet in length with an outer diameter of 28 mm. and an inner diameter of 24 mm. and was packed with CAL 12–X40 activated carbon catalyst supplied by the Pittsburgh Chemical Co. A total weight of 700 g. catalyst was used in the three columns.

Crude DODTO as a 10% (by weight) solution in hexane, was passed through the three packed columns, arranged in series. The flow rate was maintained in the range 4.2–4.9 ml./min. Following this treatment, the hexane was evaporated from a portion of the solution to leave clear yellow partially purified DODTO. When this product is heated for several hours on a steam bath a noticeable darkening occurs, presumably due to the presence of a heat unstable impurity.

This heat-unstable impurity was removed by passage of the partially purified hexane solution of DODTO through a column of fuller's earth at the same rate (4.2–4.9 ml./min.). Hexane was then stripped off, leaving an oil which did not discolor upon heating at 100% C. for two days. DODTO decomposes at 235° C./0.4 torr.

*Analysis*.—Calcd. for $C_{38}H_{72}N_2S_2$: N, 4.51; S, 10.32. Found: N, 4.69; S. 10.63.

Other sorbents may be used to purify crude DODTO. Type BK, 20–40 mesh, activated carbon, made by the Pittsburgh Coke & Chemical Co., may be substituted for CAL 12–X40 activated carbon. Like the latter, the type BK carbon yields a product containing a thermally unstable impurity. Alumina may be used in place of fuller's earth to remove the latter impurity.

A thermally stable DODTO is also obtained by passing a hexane solution of crude DODTO (5–10%) through a series of columns charged with alumina. Merck chromatographic grade alumina (Merck & Co., Rahway, N.J.), and Alcoa type F–1 alumina (Aluminum Co. of America, Pittsburgh, Pa.), have been found suitable for example.

Example 2.—N,N'-dioleyldithiooxamidozinc

DODTO (93.5 g., 0.15 mole), purified by chromatographic treatment with alumina as described in Example 1, was dissolved in hexane to make a 10% solution. This solution was added with stirring to a mixture of 0.16 mole of zinc chloride and 0.30 mole of triethylamine in 200 ml. of ethyl alcohol. The reaction mixture was then heated to reflux temperature (ca. 60° C.) for 30 minutes, 300 ml. of ethyl alcohol was added and the whole was then cooled. A gummy, opaque, off-white solid precipitated and was filtered. The filtrate was treated with 500 ml. water, causing a separation into aqueous and hexane phases. The latter phase was added to the solid, sufficient additional hexane was added to give a pourable mixture, and the mixture was washed twice with 50% aqueous ethanol. Butanol was then added to precipitate the product. After filtration the product was dried in vacuo at steam bath temperature to constant weight. A theoretical yield of translucent, amber, rubbery, N,N'-dioleyldithiooxamidozinc was obtained. The complex softens but does not liquefy at 150° C.

*Analysis.*—Calcd. for $C_{38}H_{70}N_2S_2Zn$: N, 4.09; S, 9.37; Zn, 9.55. Found: N, 4.30; S, 9.15; Zn, 9.79.

Example 3.—N,N'-dioleyldithiooxamidonickel

A solution of 0.01 mole of DODTO in 150 ml. of n-butyl alcohol and 100 ml. of isopropyl alcohol was prepared, to which was added a solution of 0.01 mole of nickel chloride in 150 ml. of ethyl alcohol and 50 ml. of isopropyl alcohol. Then 0.02 mole of triethylamine was added. The N,N'-dioleyldithiooxamidonickel precipitated as a very dark, nearly black solid that exhibited a red-violet color in thin films. After filtration and drying, a yield of 6.5 g. (quantitative yield) was obtained. The complex is soluble in aliphatic hydrocarbon solvents at ambient and elevated temperatures.

Example 4.—N,N'-dioleyldithiooxamidocadmium

To a 10% w./w. solution of 0.01 mole of DODTO in hexane was added 0.01 mole of $CdCl_2 \cdot 2.5H_2O$ and 0.02 mole of sodium acetate in 50% aqueous ethanol solution. The resulting mixture was stirred and warmed on a steam bath. The aqueous layer was removed and a 1:1 n-butyl alcohol-ethyl alcohol mixture added to the hexane layer until precipitation of the N,N'-dioleyldithiooxamidocadmium was complete. The solvents were evaporated and the residue centrifuged with fresh 1:1 n-butyl alcohol-ethyl alcohol. The solid was then dissolved in fresh hexane and obtained as a yellow wax with a greasy feel upon concentration of this solution.

Solid N,N'-dioleyldithiooxamidocadmium without a greasy feel can be prepared under other preparative conditions. For example: A solution of 0.01 mole of DODTO in 1:1 n-butyl alcohol:isopropyl alcohol was prepared.

To this was added 0.01 mole of $Cd(NO_3)_2 \cdot 4H_2O$ as a solution in isopropyl alcohol. Slow addition of a solution of 0.02 mole of triethylamine in isopropyl alcohol with stirring caused precipitation of yellow product. After filtration and drying, a yield of 6.42 g. of solid N,N'-dioleyldithiooxamidocadmium was obtained.

In view of the above, it will be seen that the several objects of the invention are achieved and other advantageous results attained.

As many changes could be made in the above products and methods without departing from the scope of the invention, it is intended that all matter contained in the above description shall be interpreted as illustrative and not in a limiting sense.

What is claimed is:

1. A composition of matter comprising a compound selected from the group consisting of N,N'-dioleyldithiooxamide and complexes thereof with polyvalent metals.

2. A composition of matter as set forth in claim 1 wherein the compound is substantially pure N,N'-dioleyldithiooxamide.

3. A compositon of matter as set forth in claim 1 wherein the compound is a complex of N,N'-dioleyldithiooxamide with a polyvalent metal selected from the group consisting of zinc, nickel, cadmium, copper and mercury.

4. A method of preparing substantially pure N,N'-dioleyldithiooxamide which comprises reacting oleylamine with dithiooxamide and subjecting the impure product of this reaction to chromatography to yield N,N'-dioleyldithiooxamide substantially free of impurities.

5. A method as defined by claim 4 wherein a chromatographic sorbent selected from the group consisting of activated carbon, fuller's earth and alumina is used in the purification step.

References Cited

UNITED STATES PATENTS 3,262,843  7/1966  Peacock _____ 167—22

TOBIAS E. LEVOW, *Primary Examiner.*

A. P. DEMERS, *Assistant Examiner.*

U.S. Cl. X.R.

8—55; 23—134, 206; 106—14.5, 292, 301; 117—36.7; 210—31; 252—42.7, 49.7, 400, 402; 260—2, 429.9, 438.1, 439, 431, 551, 814; 264—212